April 16, 1935.                    J. R. HAMMONS                    1,997,823
                                   GARDEN HOSE STAND
                                   Filed May 8, 1933
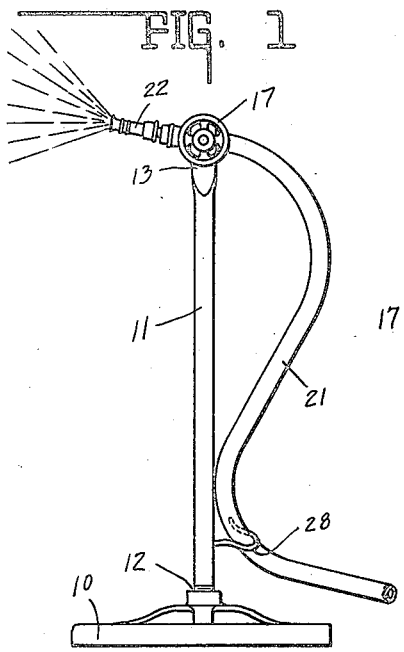
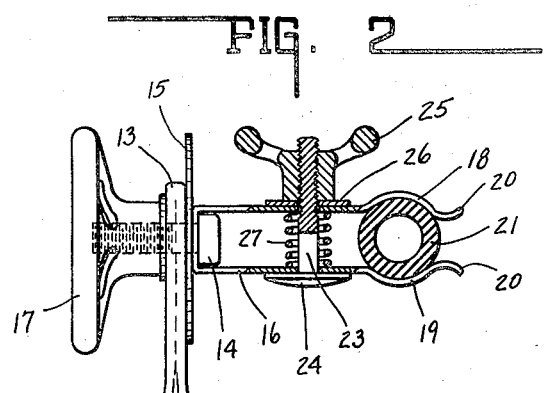
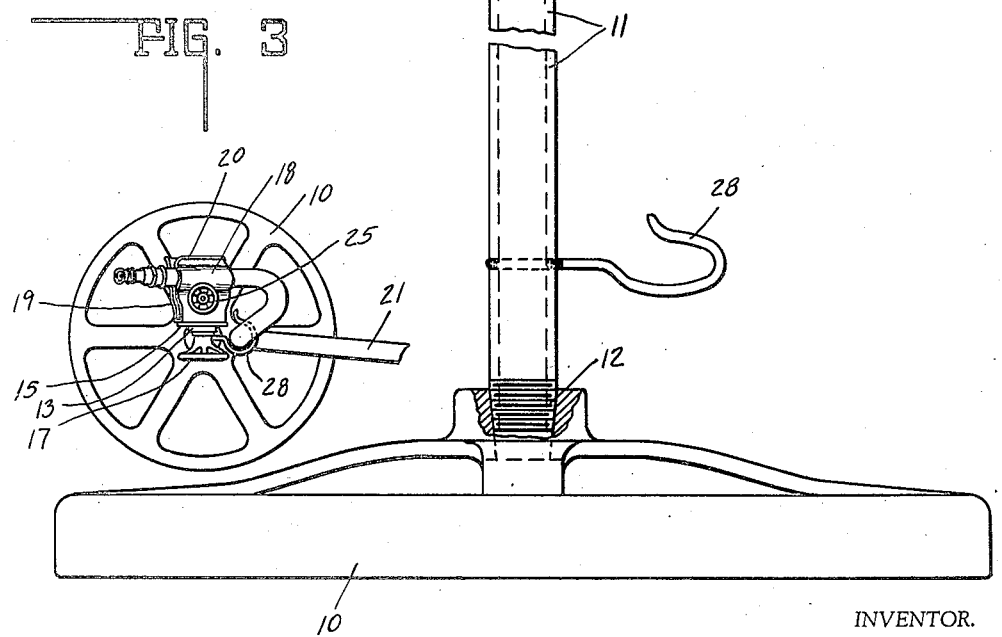
INVENTOR.
JOHN R. HAMMONS.
BY
Lockwood Lockwood Goldsmith & Gatt
ATTORNEYS.

UNITED STATES PATENT OFFICE 1,997,823

GARDEN HOSE STAND

John R. Hammons, La Fayette, Ind.

Application May 8, 1933, Serial No. 669,919

1 Claim. (Cl. 248—29)

This invention relates to a stand or support for a garden hose whereby the spray or stream may be adjustably directed to cover prescribed areas.

The object of the invention is to produce a support which may be readily handled and manipulated to avoid wetting the operator in changing it from one position to another as occurs in the use of the usual spray for automatic sprinkling. Thus, the stream or spray is directed to one side or away from the stand, permitting the operator to readily approach from the other side.

One feature of the invention relates to an adjustable hose clamp mounted upon the upper end of the stand in which a garden hose may be readily secured or removed and adjusted in position to direct the stream over the desired area through the medium of the usual nozzle.

Another feature of the invention resides in the provision of a hook-like member secured to the stand adjacent the base through which the hose may be passed so that the stand may be pulled over the lawn directly by the hose without being tipped over, said hook member further acting to prevent the clamped or adjusted position of the hose from being affected in pulling the stand over the ground thereby.

The full nature of the invention will be understood from the accompanying drawing and the following description and claim:

In the drawing, Fig. 1 is a side elevation of the stand showing a garden hose adjustably mounted thereon. Fig. 2 is an enlarged front elevation thereof showing a portion broken away and a portion in cross section. Fig. 3 is a plan view of the stand.

In the drawing there is illustrated a hose stand comprising a base 10 having an upright standard 11. The base is relatively heavy and formed of cast iron while the standard 11 is a pipe-like structure or metal tube threaded at its lower end so as to screw into the base and, therefore, be removed therefrom, as indicated at 12. The upper end of the standard is flattened to provide a head 13 having opposite flat surfaces to receive a hose clamping unit.

The clamping unit is supported upon the head 13 by a bolt 14 extending through an aperture formed therein. The bolt carries on one side of the head an annular disk washer 15 and a clamping member 16. On the other side of the head a hand wheel 17 is threaded on the bolt for rigidly locking the clamp 16 in adjusted position. Said hand wheel is provided with internal screw threads engaging the screw threads on the bolt 14. Thus, when the head of the bolt 14 is drawn inwardly by the hand wheel, the hose support is clamped and held rigidly in adjusted position, whereas when it is loosened by means of said hand wheel, adjustment may be made of the clamp to any desired position.

The clamp 16 is substantially U-shaped and formed of spring metal having at its outer free ends the jaws 18 and 19 with their outer ends flanged in opposite directions, as indicated at 20. The jaws are so curved as to receive and substantially conform to the curvature of the hose 21 supported thereby. The inner end of the U-shaped clamp embraces the square head of the bolt 14 so as to prevent relative turning thereof. Thus, the clamp may be rotated about the axis of the bolt when the hand wheel 17 is loosened and secured in any angular position to obtain the desired elevation of the hose and consequently the stream discharged from the spray nozzle 22. The disk 15 is of a diameter substantially equal to the width of the clamp so that there is frictional engagement therebetween throughout the adjacent surface of the clamp.

Extending through the opposite portions of the clamp intermediate the jaws and bolt 14 there is a tension bolt 23 having a head 24 extending upwardly into a tension hand wheel 25 into which it is screw threaded. The wheel 25 bears upon the side of the clamp through a washer 26, while a compression spring 27 surrounding the bolt within the clamp bears in the opposite direction under spring tension. Thus, upon rotating the hand wheel 25 in one direction, a clamping tension is exerted upon the hose for securing it between the jaws 18 and 19, whereas rotating the hand wheel 25 in the opposite direction permits the spring 27 to force the jaws apart to release the hose.

At the bottom of the stand adjacent the base, there is a hose hook 28 which is secured to the upright standard 11 with which the hose is engaged for securing it directly to the stand adjacent the base. Thus, the length of the hose from the hydrant to the hose stand is directly connected therewith adjacent the base of the standard rather than being connected through the clamp at the top thereof. This arrangement permits of the hose being employed to pull the stand to different positions over a lawn without effecting the clamping adjustment or tipping the stand. This means of securing the hose directly to the stand adjacent the base is most important in permitting of ready movement by the operator from a remote position.

The invention claimed is:

An adjustable garden hose stand including an annular supporting base, an upright tubular standard removably secured thereto having a flattened head at the top thereof, a supporting bolt extending through said head, a friction wheel threaded on one end thereof positioned to engage one face of the flattened standard, a U-shaped spring hose clamp adjacent the other face of said standard provided with oppositely-disposed clamping jaws conforming substantially to the curvature of a hose, the head of said bolt being engaged within said U-shaped clamp for frictionally securing it against the opposite side of said flattened face from the friction wheel, a tension bolt extending through said clamp, a tension hand wheel screw threaded thereon in engagement with the outer portion of the clamp for forcing said jaws into clamping position, a spring surrounding said bolt within the clamp tending to open said jaws when released by said hand wheel, and a hook secured to said standard adjacent said base through which the hose secured by said clamp is adapted to pass for directly connecting said hose with the stand adjacent the base thereof.

JOHN R. HAMMONS.